United States Patent [19]

Scriver

[11] Patent Number: 5,253,691
[45] Date of Patent: Oct. 19, 1993

[54] TIRE HAVING SPECIFIED BELT RUBBER COMPOSITION

[75] Inventor: Richard M. Scriver, Madison, Conn.

[73] Assignee: The Goodyear Tire & Rubber Company, Akron, Ohio

[21] Appl. No.: 819,915

[22] Filed: Jan. 13, 1992

[51] Int. Cl.$^5$ ............................................. B60C 1/00
[52] U.S. Cl. .................................... 152/537; 152/564
[58] Field of Search ............... 156/450, 526, 525, 537, 156/547, 548, 527, 564

[56] References Cited

U.S. PATENT DOCUMENTS

| | | | |
|---|---|---|---|
| 4,065,444 | 12/1977 | Delaney et al. | 152/450 |
| 4,192,366 | 3/1980 | Scriver et al. | |
| 4,221,681 | 9/1980 | Campbell et al. | |
| 4,230,841 | 10/1980 | Prudence | |
| 4,483,381 | 11/1984 | Scriver | |
| 4,531,561 | 7/1985 | Ippen et al. | 152/537 |
| 4,824,899 | 4/1989 | Yasuda | |
| 4,843,120 | 6/1989 | Halasa et al. | 152/450 |
| 4,898,223 | 2/1990 | Botzman | |
| 5,019,617 | 5/1991 | Kaidoo et al. | 152/565 |

FOREIGN PATENT DOCUMENTS

44992/79  9/1979  Australia .

OTHER PUBLICATIONS

NR Technology, vol. 8, Part 4 (1977) pp. 69-78.
NR Technology, vol. 12, Part 4 (1981) p. 98.

*Primary Examiner*—Michael W. Ball
*Assistant Examiner*—Robert W. Robey
*Attorney, Agent, or Firm*—Henry C. Young, Jr.

[57] ABSTRACT

Reinforced rubber composite and article made therefrom, wherein the reinforcement preferably comprises cords of brass-coated steel and the rubber of the composite or article is a vulcanizate of a blend comprising (A) about 5-100 phr of a graft copolymer comprising a lower alkyl acrylate or lower alkyl methacrylate and a diene rubber or mixture thereof and (B) about 0-95 phr of at least one additional diene rubber or mixture thereof. The overall alkyl acrylate or alkyl methacrylate content of the blend is about 2-10 phr, preferably about 3-8 phr. A preferred article is a tire having a load bearing fabric-reinforced component, e.g. a reinforcing belt (22) wherein the fabric comprises cords of brass-coated steel and the rubber of the component has the composition above specified.

5 Claims, 1 Drawing Sheet

TIRE HAVING SPECIFIED BELT RUBBER COMPOSITION

TECHNICAL FIELD

This invention relates to tires and particularly to steel belted radial pneumatic tires. More particularly, this invention relates to tires of this type having composite reinforcing members and particularly belts of novel composition.

BACKGROUND

Pneumatic tire are sometimes constructed with a circumferential belt reinforcement positioned in the crown portion between the tread and the carcass. Such construction is often used with radial ply carcass tires and sometimes with bias ply tires.

The belt is typically a fabric-reinforced rubber in the form of a rubber encapsulated textile fabric, or multiple filament, such as steel, glass, nylon, aramid or polyester. A steel fabric may be brass-coated in order to increase adhesion to rubber. The rubber of the belt compound may be and conventionally is natural rubber.

The belt reinforcement is used, for example, to control or limit the outward expansion or deformation of the tire in service, to provide some stability for the overall tire construction and to aid in providing a strengthening interface between the carcass plies and tread rubber.

Another and important purpose is to limit the distortion, or squirming, of the tread element as the tire rotates across a substrate (the ground or pavement, for example) and the tread passes through its footprint against the substrate. At this point of contact a considerable and continuing flexing and distortion of the tire is observed in the region of the footprint. Belt reinforcement resists such distortion. at the footprint which usually results in better tread wear characteristics. However, internal heat generation and temperature build-up within the tire and belt reinforcement as the tread distorts and moves through the footprint stresses the integrity of the belt reinforcement and may adversely affect its durability, particularly at the belt edges in the region of the tire sidewalls.

It is well recognized that the shoulder region of the tire undergoes a large amount of flexing and distortion when the tire is used in service, particularly under load. As a result, it is the shoulder region of the tire in which a substantial amount of heat build-up occurs, resulting in an increased tire running temperature in this region. Therefore heat durability of a tire reinforcing belt positioned between its tread and carcass, particularly at the belt edges in the shoulder region of the joining of tread and sidewall, is an important concern.

U.S. Pat. No. 4,483,381 to Richard M. Scriver (the inventor herein) shows and describes a pneumatic tire having a circumferential fabric-reinforced rubber belt positioned between the tread and the carcass wherein the rubber of the belt comprises about 10-45 weight percent medium vinyl polybutadiene rubber, about 55-90 weight percent cis-1,4-polyisoprene rubber (which may be either natural rubber, synthetic cis-1,4-polyisoprene, sometimes referred to as "synthetic natural rubber", or a blend of the two), and about 0-30% by weight cis-1,4-polybutadiene rubber. Data in the patent show that a blend of 40 parts of natural rubber, 40 parts of synthetic cis-1,4-polyisoprene and 20 parts (all by weight) of medium vinyl polybutadiene showed better adhesion to brass-coated steel cords aged at elevated temperatures in a nitrogen atmosphere, but poorer adhesion to cords aged at elevated temperatures in a water vapor atmosphere, than did a control composition comprising 50 parts by weight of natural rubber and 50 parts by weight of synthetic cis-1,4-polyisoprene.

U.S. Pat. No. 4,898,223 to Botzman et al is directed to a stiff rubber composition and the apex component of a tire made therefrom, wherein the stiff rubber composition is comprised of, based on 100 parts by weight rubber, a blend of (A) about 10 to about 60, preferably about 20 to about 40 parts by weight polyoctenamer rubber having a ML-4 viscosity value at 120° C. in a range of about 4 to about 6 in its unvulcanized state, (B) about 10 to about 60, preferably 20 to about 40 parts by weight alkyl methacrylate grafted cis-1,4-polyisoprene rubber having a mole ratio of methacrylate to rubber in the range of about 0.25/1 to about 1.5/1, preferably about 0.4/1 to about 1/1, and (C) about 30 about 80 parts by weight of at least one additional sulfur curable rubber selected from natural rubber and synthetic rubber containing carbon-to-carbon double bonds therein. The polyoctenamer rubber acts principally as a processing aid. The rubbers of this patent are stiff, having a 3 point bend test value (ASTM D-4475-85) in excess of 20, and a relatively low elongation at break; a specific composition illustrated in the examples has an elongation at break of only 160 percent. Such rubber composition is useful as the rubber of the apex component of a tire since it enhances the tires cornering characteristic and consequently improves the cornering stability of a vehicle equipped with such tires.

U S. Pat. No. 4,824,899 to Yasuda furnishes another illustration of a stiff rubber suitable as the rubber of the apex component (which is called the "bead filler" in that patent). A metal acrylate is added to impart stiffness. Various specific compositions are disclosed, all of which have elongations at break of 200 percent or less. The disclosed purpose of the stiff apex or bead filler component is to improve cornering stability.

M. A. Wheelans, NR Technology, vol. 8, part 4 (1977), pp. 69–78 describes blends of natural rubber with "Heveaplus MG49" ranging from 30 to 80 parts by weight of natural rubber and conversely 20 to 70 parts by weight of "Heveaplus MG49". This article also describes vulcanizates of these blends and their use in energy absorption devices, particularly body components, (e.g., bumpers) in automobiles. The vulcanizates are elastomeric. "Heveaplus MG" is a tradename denoting a graft copolymer of natural rubber and methyl methacrylate (MMA) prepared by graft polymerization of MMA in natural rubber latex according to NR Technology, vol. 12, part 4, 1981, pages 98 and 99. This graft copolymer can be used as a reinforcing resin in natural rubber, according to NR Technology, vol. 8 (4), 1977, 70. Viscosity of the unvulcanized mix increases and elongation at break of the vulcanizate decreases, with increasing "Heveaplus MG49" content. "Heveaplus MG49" is available from plantation agencies SDN. Berhad Penang, Malaysia, according to the article. The later article NR Technology, 12 (4), 1981, pp. 98-99, discloses different grades of "Heveaplus MG", and nominal proportion of poly(methyl methacrylate) in "Heveaplus MG49" as 49% m/m.

DISCLOSURE OF THE INVENTION

In accordance with one aspect of this invention, there is provided a brass coated steel-reinforced rubber composite wherein the rubber of said composite comprises (A) from about 5 to about 100 parts by weight of a graft copolymer comprising a lower alkyl acrylate or lower alkyl methacrylate and a diene rubber, and (B) from 0 to about 95 parts by weight of at least one additional diene rubber, per 100 parts of rubber, said alkyl acrylate or alkyl methacrylate constituting from about 2 to about 10 parts by weight per 100 parts of rubber, the rubber of said component having an elongation at break of at least 200 percent, preferably at least 250 percent. More preferably, the rubber has an elongation at break of at least 300 percent and a 300 percent modulus from about 12 megapascals, (MPa) to about 22 MPa. (One pascal is one newton per square meter). The "at least one additional diene rubber" is used as an ungrafted diene rubber or mixture thereof. The overall acrylate or methacrylate content is from about 2 to about 10 parts by weight per 100 of rubber.

The above composition may be expressed as (A) about 5-100 phr of a graft copolymer comprising a lower alkyl acrylate or lower alkyl methacrylate and diene rubber, and (B) about 0-95 phr of at least one additional diene rubber, said alkyl acrylate or alkyl methacrylate constituting about 2-10 phr, wherein phr denotes parts by weight per 100 of rubber (or polymer). The term, "rubber", in this context denotes the entire rubber (or polymer) content of the composite.

In accordance with the preferred embodiment of this invention, there is provided a tire comprising two substantially inextensible circumferential beads, and outer circumferential tread, a pair of sidewalls and at least one load bearing fabric reinforced component comprising a reinforcing fabric of a high modulus material imbedded in a rubber matrix. The "at least one load bearing fabric reinforced component" includes a carcass, a reinforcing belt, which consists of one or more fabric-reinforced rubber plies situated between the tread and the carcass, or both. In a preferred embodiment of this invention, a reinforcing belt has a rubber composition as described above, and the carcass may either have a rubber composition as described above or a conventional rubber composition. The fabric of such component may be conventional.

Except for the rubber of the reinforcing components, the construction of the tire may be conventional.

Various filaments can be used to form the fabric of a fabric reinforced belt used in this invention. Typically, such filaments, except for monofilament reinforcement, are cabled together to form cords thereof. Representative of various filaments are steel, metal alloy-coated steel, glass, nylon, aramid, and polyester. The alloy coating when used is typically a copper alloy, and in particular brass.

The term, "fabric", has the usual meaning in the tire industry and denotes a network of essentially unidirectionally extending cords, which may be twisted, and which in turn are composed of a plurality of a multiplicity of filaments, (which may also be twisted) of a high modulus material. The fabric is woven and is flexible. In addition to the aforesaid network of essentially unidirectionally extending cords, which extend longitudinally and form the warp of the fabric, the fabric typically contains transverse threads, known as the "pick" or "fill". The width of the fabric typically far exceeds the thickness (e.g., by a factor of 10 or more). The width is measured at right angles to both the radius and the circumference (e.g., from bead to bead in the case of a carcass ply and from shoulder to shoulder in the case of a reinforcing belt) while thickness is measured in the radial direction.

The term, "cord" denotes a plurality of bundles or strands of grouped filaments of a high modulus material, notably brass coated steel, wherein the steel filaments are assembled into strands by a first twisting operation and in which a number of strands are then assembled into the final cord by a second twisting operation, which is preferably in the opposite direction from the first twisting operation, as more fully described, for example, is Australian Patent number 44992/79, filed Mar. 9, 1979 and published Sep. 20, 1979 as document number AUA1 44992/79.

PRACTICE OF THE INVENTION

This invention will now be described in detail with reference to the best mode and preferred embodiment thereof.

Figure 1:
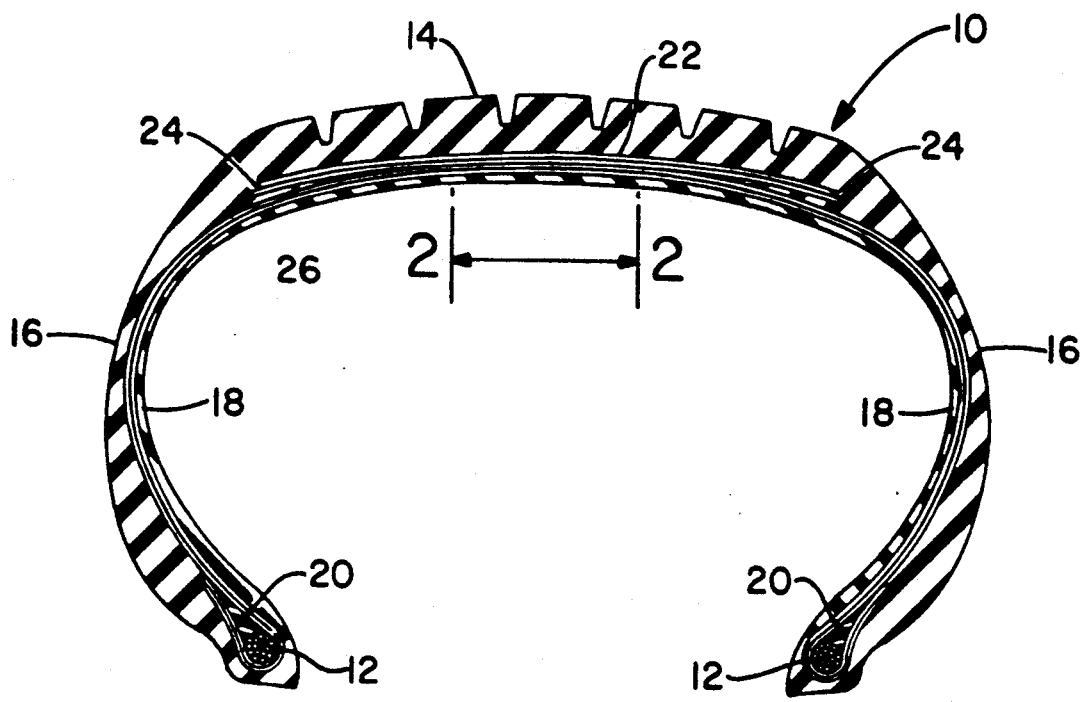
FIG. 1 is a cross-sectional view of a pneumatic tire according to this invention, showing the tread, carcass plies and reinforcing belt therein.

Referring now to the drawing and particularly to FIG. 1 thereof, 10 is a pneumatic radial tire comprising 2 spaced substantially inextensible circumferential beads 12, an outer circumferential road-engaging tread 14, and 2 sidewalls 16 which extend radially from the respective shoulder regions of tread 14 to respective beads 12. Tire 10 further comprises a fabric reinforced rubber carcass 18 of toroidal shape, extending from one bead to the other and composed of one or more radial plies of fabric-reinforced rubber. The ends of carcass 18 extend around spaced circumferential bead wires 12 and are folded back in the conventional manner. A pair of filler strips 20 of triangular cross-section extend radially outwardly from the bead wires 14. Tire 10 further comprises a circumferential reinforcing belt 22 consisting of one or more plies of fabric-reinforced rubber. The reinforcing belt is positioned between the carcass 18 and the tread 14. The ends 24 of belt 22 are in the shoulder regions where the sidewalls 16 join the tread 14. Tire 10 may also have a inner liner 26 which is applied to the inner surface of carcass 18.

The structure of tire 10 may be conventional. Also, materials forming parts or components or the tire 10, other than the rubber of the reinforcing belt 22, may be conventional. The rubber of carcass 18 may be according to this invention or alternatively may be conventional. At least one fabric reinforced load bearing part or component is made from a rubber according to this invention. Typically either the rubber of carcass 18, or the rubber of reinforcing belts 22, or both, is according to this invention. FIG. 1 has been simplified in the interest of clarity by omitting parts which are not required for an understanding of this invention.

The term "pneumatic tire" is used herein to refer to tires of both the pneumatic and semi-pneumatic type. Conventionally, pneumatic tires rely upon an internal air pressure to maintain its shape when mounted on a rim and placed under load, whereas a semi-pneumatic tire, although containing a gas such as air which might be under pressure in the tire cavity, does not completely rely upon the gas for support of the tire itself.

The structures of carcass 18 and reinforcing belts 22 will now be described in further detail with reference to FIG. 2.

Figure 2:
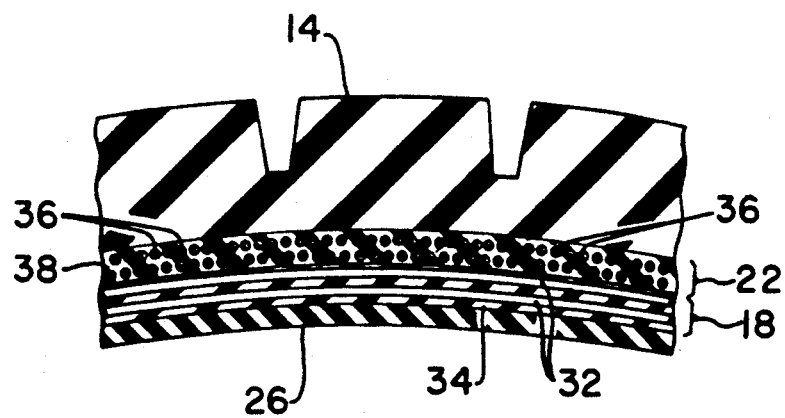
FIG. 2 is a cross-sectional view, on an enlarged scale taken from position 2—2 of FIG. 1, of portions of the tread, carcass and reinforcing belt in a tire according to this invention.

Referring now to FIG. 2, carcass 18 is a fabric-reinforced rubber structure in which each ply has a reinforcing fabric composed of long, typically continuous radial cords 32 embedded in a rubber matrix 34. The materials forming both cords 32 and the rubber matrix (or carcass rubber) 34 may be conventional. Alternatively, the material forming rubber matrix 34 (i.e., the matrix rubber) may be in accordance with this invention. Thus, cords may be made of steel, nylon, polyester or glass fibers, for example. Steel cords may be plated with an alloy such as brass (which is not only 70% copper, 30% zinc by weight) or other copper alloy in order to improve the adhesion of the cords to the rubber. Typically there are two carcass plies as shown in FIG. 2.

The circumferential reinforcing belt 22 is composed of one or more plies (two are shown) of fabric composed of cords 36 embedded in a rubber matrix 38. The cords 36 are of a high modulus material (examples of which have been given above) which has a modulus many times higher than that of the carcass rubber 34. The cords are essentially inextensible in the circumferential direction (perpendicular to the plane of FIG. 2) and in the lateral direction (from left to right as seen in FIG. 2). Cords 36 are preferably of brass plated steel. As will be subsequently described, the composition of the rubber matrix 38 of belts 2 is such as to give improved adhesion to brass coated steel as compared to wire coat compounds (i.e., rubber compositions for reinforcing belts) which are presently known. Also, as will be described, the composition of rubber matrix 38 is such as to exhibit improved mechanical properties compared to those of presently known wire coat compounds. The matrix rubber 28 forming belt 22 should have a higher modulus than that of the carcass rubber 34.

The rubber forming belt 22 (or more broadly, a reinforcing member or layer), which is sometimes called a wire coat compound, is a polymer blend comprising (A) about 5 to 100 parts by weight of a graft copolymer comprising about 10 to about 60 parts by weight of polyalkyl acrylate or methacrylate, balance diene rubber, and conversely (B) 0 to about 95 parts by weight of at least one additional diene rubber, which is used per se, i.e., as an ungrafted diene rubber or mixture thereof, per 100 parts of rubber forming belt 22. The overall acrylate or methacrylate content in the rubber forming belt 22 (or other reinforcing member or lazer) is from about 2 to about 10, preferably from about 3 to about 8, parts by weight per 100 of rubber. Compounding and vulcanization of the additional diene rubber may be and preferably are conventional, and in any case this diene rubber is not further reacted to form a graft copolymer.

The wire coat compound is preferably a blend comprising (A) about 5 to about 30 parts by weight of said graft copolymer, which in turn comprises about 40 to about 60 parts by weight of said lower alkyl acrylate or methacrylate, balance said diene rubber, and (B) about 70 to about 95 parts by weight of said additional diene rubber. A particularly preferred blend comprises (A) about 10 to about 20 parts by weight of a graft copolymer as above described and conversely about 80 to about 90 parts by weight of unreacted diene rubber or mixture thereof with an overall acrylate or methacrylate content of about 2 to about 10 and preferably about 3 to about 8 parts by weight per 100 of rubber (phr) as previously noted. The preferred graft copolymer comprises about 45 to about 55 parts by weight of polymethyl methacrylate, balance cis-1,4-polyisoprene, which may be natural rubber or synthetic cis-1,4-polyisoprene ("synthetic natural rubber") or a mixture thereof.

The term "ungrafted diene rubber" refers to rubber which has been compounded and cured but not modified by formation of a graft copolymer.

The alkyl acrylate or alkyl methacrylate is a lower alkyl acrylate or methacrylate (the lower alkyl comprises from 2 to about 10 parts by weight (preferably from 3 to about 8 parts by weight), per 100 parts of rubber of the belt 22. The amount of alkyl acrylate or methacrylate must be sufficient so that the belt rubber has an elongation at break of at least 200%, preferably at least 250%, most preferably at least 300% with a 300% modulus which is in the range of about 12 to about 22 megapascals. By providing a polymer blend in which the overall acrylate or methacrylate content is within the range specified above, one is able to achieve a combination of desired elongation at break with desired stiffness.

The diene rubbers used herein for the graft copolymer may be a rubber which contains a carbon to carbon unsaturation therein in order to enable it to be sulfur cured, as for example, cis-1,4-polyisoprene (either natural rubber or "synthetic natural rubber"), polybutadiene, styrene/butadiene copolymers (SBR), styrene/isoprene/butadiene terpolymers, butadiene/acrylonitrile copolymers, and isoprene/acrylonitrile copolymers, or a mixture of such rubbers. Generally, cis-1,4-polyisoprene, either natural or synthetic or a blend of the two, is preferred. Natural rubber is especially preferred.

The graft copolymer is one in which the lower alkyl acrylate or methacrylate is grafted onto a diene rubber. Preferably the graft copolymer comprises a lower alkyl methacrylate, and in particular methyl methacrylate grafted onto cis-1,4-polyisoprene. The graft copolymer can typically be prepared by free radical polymerization of alkyl methacrylate monomer in a cis-1,4-polyisoprene emulsion, preferably natural rubber aqueous latex, in the presence of a peroxide initiator, and recovering the graft polymer therefrom, as disclosed for example in U.S. Pat. No. 4,898,223 cited supra.

A preferred natural rubber/poly(methylmethacrylate) graft copolymer for use in blends forming the reinforcing belt 22 is "Heveaplus" MG, which is a trademark of Malaysian Rubber Producers' Research Association (MRPRA), Hartford, England, denoting modified raw natural rubber prepared by the graft copolymerization of methyl methacrylate in a natural rubber latex. The graft poly(methacrylate) is present essentially as relatively long side chains attached to the natural rubber molecules. In particular, the grade, "Heveaplus" MG 49 is preferred. The "49" denotes a nominal proportion of 49% by weight of poly(methyl methacrylate), balance natural rubber. Such material is described, for example, in NR Technology, vol. 12, part 4, 1981, pages 98–99 and in U.S. Pat. No. 4,221,681 to Campbell et al. The "Heveaplus" MG copolymers are commercially unvulcanized state. These copolymers can be compounded and vulcanized like natural rubber. The vulcanizates are elastomers. The "Heveaplus" MG vulcanizates have good strength and impact resistance characteristics and high hardness. "Heveaplus" MG products can be blended in all proportions with natural rubber to produce vulcanizates in a wide range of hardness Their hardness depends in some measure on the compounding formulas, and fillers may be added to increase hardness.

While poly (methyl methacrylate) is the preferred graft polymer in the graft copolymer, other lower alkyl acrylates and lower alkyl methacrylates, particularly the latter, in which the lower alkyl group contains from 1 to about 10 carbon atoms, can be used.

While cis-1,4-polyisoprene (either natural rubber, "synthetic natural rubber" or blend of the two) can be used as the base rubber of the graft copolymer, other diene rubbers, as will be explained below, including mixtures thereof, can be used.

The preferred additional rubber, or mixture thereof, forming belt 22 preferably comprises (1) about 10 to about 45, preferably about 15 to about 30, weight percent medium vinyl polybutadiene rubber, (2) about 55 to about 90, preferably about 70 to about 85, weight percent cis-1,4-polyisoprene rubber selected from at least one of natural rubber and synthetic cis-1,4-polyisoprene and (3) 0 to about 30 (preferably either 30 or about 10 to about 25), weight percent cis-1,3-polybutadiene rubber, as more fully disclosed in U.S. Pat. No. 4,483,381 cited supra. (Other diene rubbers as described above, other than medium vinyl polybutadiene rubber and cis-1,3-polybutadiene rubber, can be substituted for natural rubber or synthetic cis-1,4-polyisoprene). A preferred rubber of this type is composed of 40 parts by weight of natural rubber, 40 parts by weight of synthetic cis-1,4-polyisoprene rubber and 20 parts by weight of medium vinyl polybutadiene rubber, per 100 parts by weight of rubber forming this additional diene rubber. The medium vinyl polybutadiene rubber generally has a medium vinyl 1,2-content in the range of about 25 to about 50 percent by weight. The remainder of the polymer structure of the vinyl polybutadiene is largely cis and trans-1,4 structure. The medium vinyl polybutadiene can be prepared by various processes, such as those already known in the art, e.g., by copolymerizing 1,3-butadiene with a very small amount of divinyl benzene (DVB) in a hydrocarbon solvent system, preferably an essentially non-polar aromatic solvent, with an alkyl lithium catalyst and one or more polar catalyst modifiers to affect the polymers vinyl content. Further details are found in U.S. Pat. No. 4,230,841.

Other diene rubbers (including mixtures thereof) can be used for both the base rubber of the graft copolymer and for the additional (unreacted or unmodified) diene rubber. The term, "diene rubber" includes conventional rubbers or elastomers such as natural rubber and all its various raw and reclaimed forms as well as various synthetic unsaturated or partially unsaturated rubber, i.e., rubber polymers of the type which may be vulcanized with sulfur. Representative of synthetic polymers are the homopolymerization products of butadiene and its homologues and derivatives as for example, methyl butadiene, dimethyl butadiene and pentadiene as well as copolymers such as those formed from a butadiene or its homologues or derivatives with other unsaturated organic compounds. Among the latter are olefins, for example, ethylene, propylene or isobutylene which copolymerizes with isoprene to form polyisobutylene also known as butyl rubber; vinyl compounds, for example, vinyl chloride, acrylic acid, acrylonitrile (which polymerizes with butadiene to form NBR), methacrylonitrile, methacrylic acid, methyl styrene and styrene, the latter compound polymerizing with butadiene to form SBR, as well as vinyl esters and various unsaturated aldehydes, ketones and ethers, e.g., acrolein and vinylethyl ether. Also included are the various synthetic rubbers prepared from the homopolymerization of isoprene and the copolymerization of isoprene with other diolefins and various unsaturated organic compounds. Also included are the synthetic rubbers such as 1,3-cis-polybutadiene and 1,4-cis polyisoprene and similar synthetic rubbers which have been developed in recent years, such as EPDM. Such recently developed rubbers include those that have polymer bound functionalities such as antioxidants and antiozonants. These polymer bound materials are known in the art and can have functionalities that provide antidegradative properties, synergism, and other properties. The preferred diene containing polymers for use in the present invention include natural rubber, polybutadiene, synthetic polyisoprene, styrene/butadiene copolymers (SBP), isoprene/butadiene copolymers, and styrene/isoprene/butadiene terpolymers, NBR, terpolymers of acrylonitrile, butadiene and styrene and blends thereof.

By way of illustration, a preferred blend contains 10 phr of "Heveaplus MG49" and conversely 60 phr of ungrafted cis-1,4-polyisoprene (natural rubber) and 30 phr of ungrafted polybutadiene (the additional diene rubbers in this case). The polymer content of "Heveaplus MG49" (the graft copolymer) is 49% by weight MMA, the remainder being natural rubber. The overall MMA content of the blend is 4.9% (i.e., 0.49 weight fraction of MMA in the graft copolymer multiplied by 0.10 weight fraction of graft copolymer to total rubber (or polymer blend, overall) This same overall content of MMA (or other desired overall alkyl acrylate or alkyl methacrylate within the above indicated range) can be achieved by proportionately more of a graft copolymer containing proportionately less MMA, or conversely by using proportionately less copolymer which contains proportionately more MMA. The overall acrylate or methacrylate content is simply the product of weight fraction of alkyl acrylate or methacrylate, based on total polymer content of the graft copolymer, multiplied by the weight fraction of the graft copolymer in the overall wire coat compound or blend.

It shall be understood that both the additional (i.e., ungrafted) rubber of the blend and the rubber used as the backbone in forming the graft copolymer will contain compounding ingredients. Such compounding ingredients may be conventional, and may be present in conventional amounts. Such compounding ingredients may include, for example, about 0 to about 10 phr of processing oil, about 20 to about 70 phr of carbon black, about 2 to about 10 phr of zinc oxide, about 1 to about 5 phr of stearic acid and/or zinc stearate, about 0.5 to about 2 phr of cure accelerator(s), about 0.5 to about 12 phr of adhesion promoter(s) and about 5.0 to about 7.0 phr of sulfur.

The amount of sulfur in the ungrafted diene rubber is at least 5 phr, which is higher than the amount conventionally used in forming either a carcass rubber or a belt rubber (such amount typically being no more than 4 phr).

A rubber composition of the present invention may contain, as an adhesion promoter, in situ generated resorcinol-formaldehyde (RF) resin, which is formed by compounding an unvulcanized rubber stock composition with a methylene acceptor and a methylene donor. These react during vulcanization to form a phenol-formaldehyde resin in situ. The most common methylene donors include N-(substituted oxymethyl) melamine, hexamethylenetetramine or hexamethoxymethylmelamine. A common methylene acceptor is a dihydroxybenzene compound such as resorcinol or a resorcinol ester such as resorcinol monobenzoate (RMB). The RF resin increases the stiffness of the rubber and promotes adhesion of the rubber to a reinforcing material when present. The in situ method has been found to be particularly effective where the reinforcing material is brass coated steel wire, since pretreatment of the wire with the RF system has been observed to be largely ineffective. In situ generated RF resins of this type are disclosed in U.S. Pat. No. 3,517,722 (methylene acceptor may be resorcinol) and U.S. Pat. No. 4,605,696 (methylene acceptor is a resorcinol ester). Another suitable methylene acceptor is meta-aminophenol (disclosed in U.S. Pat. No. 3,517,722 cited supra), although in general either resorcinol or a resorcinol ester such as the benzoate is preferred. The amount of phenol-formaldehyde resin and specifically RF resin used as adhesion promoter may be from about 0.5 to about 12 phr, based on the total rubber composition. A mixture of and inclusion of an adhesion promoter is known in the art and does not form a part of the present invention.

It is not necessary to add any processing aid, such as oil or a low molecular polymer such as the polyoctenamer disclosed in U.S. Pat. No. 4,898,223, to the unvulcanized rubber or mixture as a processing aid. Instead, an unvulcanized mixture consisting essentially of the aforesaid graft copolymer, the aforesaid diene rubber and compounding ingredients has sufficiently low viscosity for processing in ordinary mixing equipment. Either or both diene rubbers, i.e., the graft copolymer base and the additional diene polymer, may be oil extended or not as desired. The unvulcanized rubber compositions herein (and the vulcanizates) also differ from those of U.S. Pat. No. 4,898,223 in that the present compositions have a higher sulfur content.

Vulcanizates of the above described rubber compositions are sulfur cured elastomers having an elongation at break of at least about 200%, preferably at least 250%, more preferably at least about 300% with a 300% modulus in the range of about 10 to about 22 megapascals (MPa), preferably from about 12 to about 20 megapascals. Tires prepared according to this invention are useful for trucks, heavy duty off-road vehicles such as tractors, and passenger cars and are especially useful as heavy duty tires for trucks and heavy duty off-road vehicles. The desired modulus will be higher in a truck tire or other heavy duty off-road vehicle tire than in a passenger car tire but will be in the overall range specified above in any case. The modulus of the vulcanized rubber can be controlled by adjusting the amount of acrylate or methacrylate in the unvulcanized compound; the greater the amount of acrylate or methacrylate, the higher the modulus of the vulcanizate. The values of all physical and mechanical properties herein, refer to the rubber as freshly vulcanized unless the contrary is expressly stated (as for example in aging tests). It is known in the art that rubbers tend to become stiffer as they age, and so the elongation will drop with aging.

The rubber of carcass 18 may be either a rubber composition according to this invention or a conventional carcass rubber composition.

Various rubber compositions which are known in the art can be used when a conventional carcass rubber composition is desired. The carcass rubber is typically at least one sulfur vulcanized high unsaturation diene rubber or blend thereof. Representative of such rubbers are natural rubber, cis-1,4-polybutadiene and styrene/-butadiene rubber (SBR). Other suitable carcass rubbers are known in the art and will not be listed here. Suitable compounding ingredients for carcass rubbers are known in the art; a representative list of such compounding ingredients and suitable range amounts have been given above.

The tread rubber is typically a sulfur vulcanized high unsaturation diene rubber, or blend thereof. Suitable tread rubber compositions are known in the art. Representative of such high unsaturation rubbers, are natural rubber and synthetic rubbery polymers of cis-1,4-polyisoprene, cis-1,4-polybutadiene, vinyl 1,2-polybutadiene, styrene/1,3-butadiene copolymer and medium vinyl styrene/1,3-butadiene copolymer rubber.

The tread rubber, (i.e., the rubber forming tread 14) should have a lower modulus than that of the rubber which forms the matrix of belt 22.

The apex rubber (i.e., the rubber which forms apexes or filler strips 16) should be a stiff rubber as is known in the art, in order to assure good cornering characteristics of the tire and the vehicle on which it is mounted. Among the suitable stiff rubber compositions suitable as apex rubbers are the compositions disclosed in U.S. Pat. No. 4,898,223 cited supra. The apex rubber typically has an elongation at break not over about 200 percent.

Tires according to this invention can be built and cured according to conventional tire building and curing techniques. The belt can typically be applied in the building of the green tire which the uncured belt is built prior to the tread member following which the green tire is shaped and cured. Curing can be in a conventional mold at conventional temperatures, e.g., about 100° to about 200° C.

This invention will now be described further with reference to the examples which follow.

EXAMPLE 1.

This example describes preparation and testing of a control formulation A and an experimental (or test) formulation B in accordance with this invention. In the tables accompanying this example, "control" is abbreviated "Ctrl." and "experimental" is abbreviated "Exptl." Quantities of ingredients in Table 1 are in phr., i.e., parts by weight of ingredient per 100 parts of rubber or other polymer.

TABLE 1

| Ingredients | Ctrl. A phr | Exptl. B phr |
|---|---|---|
| Natural Rubber (cis-1,4-polyisoprene) | 70 | 60 |
| Synthetic rubber (polybutadiene) | 30 | 30 |
| "Heveaplus" MG 49 | 0 | 10 |
| Carbon Black (ISAF) | 52 | 52 |
| Processing Oil | 2 | 2 |
| Adhesion Promoter (1) | 8 | 8 |
| Antidegradant | 3 | 3 |
| Accelerator | 0.75 | 0.75 |
| Zinc Oxide | 8 | 8 |

TABLE 1-continued

| Ingredients | Ctrl. A phr | Exptl. B phr |
|---|---|---|
| Sulfur | 4 | 4 |

(1) Note: Hexamethoxymethylmelamine, Cobalt, Naphthanate, and Resorcinol

"Heveaplus" MG 49, referred to in Table 1 above, is a commercially available product which is a graft copolymer prepared by graft polymerization of methyl methacrylate in a natural rubber latex, in which the graft poly(methyl methacrylate) is present essentially as relatively long side chains attached to the natural rubber molecules. This product is obtained commercially int he uncured form from the Malaysian Rubber Producers' Research Association, Hartford England.

Control sample sheets A and experimental sample sheets B were tested for various mechanical properties. All tests were performed a room temperature (RT) unless otherwise indicated. Results are shown in Table 2 below.

TABLE 2

| Property | CTRL. A | EXPTL. LAB B |
|---|---|---|
| Modulus (MPa) | | |
| 100% | 2.0 | 2.92 |
| 300% | 7.6 | 10.44 |
| Tensile strength MPa | 16.1 | 15.64 |
| Elongation, % at break | 521 | 439.00 |
| Hardness [Shore A] | 73.8 | 76.00 |
| Rebound, % | | |
| RT | 30.5 | 34.00 |
| 100° C. | 45.6 | 46.80 |
| Rheometer (Monsanto), dN-M | | |
| TC25 | 10.2 | 9.20 |
| TC90 | 26.5 | 28.00 |

In the above table and throughout the specification, MPa denotes megapascals and dN · m denotes decinewton meters.

Data in Table 2 above show that the experimental sample B had a substantially higher modulus (both 100% and 300%) than did the control sample A. In short, the modulus of the belt rubber is closer to that of the belt wires and correspondingly less close to the moduli of the carcass rubber and tread rubber in the experimental sample B than in the control sample A. At the same time, tensile strength and elongation are only slightly less in the experimental sample B than in the control sample A. Hardness is not significantly affected. Rebound at room temperature is appreciably better in the experimental sample then in the control sample, while there is no significant difference in rebound at 100° C. TC25 and TC90, which denote the cure times (in minutes) to obtain 25% and 90%, respectively, of maximum torque development, are not significantly affected.

A larger, (i.e., factory mix scale) batch of the experimental composition B, shown in Table 1, was prepared. This composition was used as the tread stock in experimental tires.

Experimental tires thus prepared were tested for various mechanical properties. All tests were performed at room temperature (RT) unless otherwise indicated. Results are shown in TABLE 2A below.

TABLE 2A

| Property | EXPTL. B |
|---|---|
| Modulus (MPa) | |
| 100% | 4.27 |
| 300% | 14.03 |
| Tensile strength MPa | 18.95 |
| Elongation, % at break | 445 |
| Hardness [Shore A] | 80 |
| Rebound, % | |
| RT | 41.50 |
| 100° C. | 53.30 |
| Rheometer (Monsanto), dN · m | |
| TC25 | 8.90 |
| TC90 | 23.10 |

The factory mix data (obtained on experimental factory mixed stock) in TABLE 2A are believed to be more reliable than the laboratory data in TABLE 2. Differences between factory mix data and laboratory data are frequently observed. The factory mix data are believed to be more reliable because (1) mixing conditions and testing procedures are both more tightly controlled in tire tests than in the laboratory, (2) a much larger quantity of compound is prepared in the factory (approximately 3,000 pounds, from which numerous data points were generated, vs. a 5 pound laboratory sample form which only one data point was generated), and (3) the tire data represent the average of a greater number of runs than the laboratory data.

EXAMPLE 3

A control sample A and an experimental sample B (laboratory scale) were tested for flex resistance as follows: Sample sheets of each composition as shown in Table 1 were cured for five minutes at 180° C. Sample sheets of each composition were tested at 135° C. according to a test in which each sheet was alternatively subjected to tension (66% strain) and relaxation at a frequency of 360 times per minute. Eight sample sheets of each composition were used in this test. The number of minutes to break for each sheet was measured. Results based on laboratory data are shown in Table 3 below.

TABLE 3

| | Minutes to Break | |
|---|---|---|
| | Ctrl. A | Exptl. B |
| Maximum | 79 | 111 |
| Minimum | 55 | 41 |
| Average | 66 | 82 |

Results in Table 3 show that on average experimental samples B have greater flex resistance then do control samples A.

EXAMPLE 4

Samples (laboratory scale) of compounded rubber, having the compositions A and B shown in Table 1, were cured at 180° C. for 15 minutes and tested for adhesion to brass-coated steel cords. The test was conducted by curing two blocks of the compounded rubber blend together with two brass plated opposing steel wires there between, applying pull at tension to the wires, and then measuring the amount of force required to pull at least one of the wires from the rubber block sandwich. The blocks were approximately 0.5 inch (0.13 cm) thick and approximately 1 inch (2.5 cm)

square. Adhesion in newtons was measured on samples as formed and after aging in water for 5 days at 90° C. and in a salt solution for 72 hours at 90° C. Results based on laboratory data are shown in Table 4.

TABLE 4

| Conditions | Ctrl. A | Exptl. B |
| --- | --- | --- |
| Original Adhesion (93° C.) | 255 | 305 |
| Aged Adhesion | | |
| Water, 5 days, 90° C. | 286 | 369 |
| NaCl solution, 72 hrs, 90° C. | 295 | 347 |

While the fabric reinforced rubber composition (or composite structure) has been described with particular reference to a reinforcing belt for a tire, it will be understood that other fabric-reinforced rubber parts of a tire can employ a matrix rubber composition in accordance with this invention.

While certain representative embodiments in details have been shown and described for the purpose of illustrating the invention, it will be apparent to those skilled in the art that various changes and modifications maybe made therein without departing from the scope of spirit of the invention.

What is claimed is:

1. A tire comprising two substantially inextensible circumferential beads, an outer circumferential tread, two sidewalls extending radially from and connecting said tread to said beads, and a plurality of load-bearing fabric reinforced components including a toroidal shaped fabric reinforced rubber carcass and a circumferential fabric reinforced rubber belt positioned between said tread and said carcass, wherein said belt comprises a fabric embedded in a reinforced and vulcanized rubber composition and wherein the fabric of said belt comprises a plurality of cords of substantially inextensible high modulus material, said fabric of said belt being woven and flexible and having a width at least about 10 times as great as its thickness, and wherein the rubber of said belt is a sulfur cured blend comprising (A) about 5 to about 30 parts of a graft copolymer of a lower alkyl acrylate or lower alkyl methacrylate and natural rubber, said graft copolymer comprising about 40 to about 60 parts by weight of said lower alkyl acrylate or methacrylate, balance said natural rubber, and (B) about 70 to about 95 parts by weight of an additional diene rubber or mixture thereof, per 100 parts of rubber, the rubber of said belt having an overall alkyl acrylate or alkyl methacrylate content from about 2 to about 10 parts by weight per 100 parts of said rubber of said belt, the vulcanized rubber composition of said belt having an elongation at break of at least 200%.

2. A tire according to claim 1 wherein the rubber composition of said reinforcing belt is a sulfur cured blend consisting essentially of (A) about 10 to about 20 parts by weight of said graft copolymer, conversely (B) about 80 to about 90 parts by weight of said additional diene polymer or mixture thereof, and (C) compounding ingredients, per 100 parts of rubber, and wherein the overall acrylate or methacrylate content of the rubber forming said belt is from about 3 to about 8 parts by weight per 100 of rubber.

3. A tire according to claim 1 wherein the material of said fabric is brass coated steel, and wherein said blend includes an adhesion promoter.

4. A tire according to claim 11 wherein the additional diene rubber of said belt is a mixture of (1) about 10 to about 45 weight percent medium vinyl polybutadiene rubber, (2) about 55 to about 90 weight percent cis-1,4-polyisoprene rubber and (3) 0 to about 30 weight percent cis-1,3-polybutadiene rubber.

5. A tire according to claim 1 wherein the vulcanized rubber composition of said belt has an elongation at break of at least about 300% and a 300% modulus in the range of about 10 to about 22 megapascals.

* * * * *